UNITED STATES PATENT OFFICE.

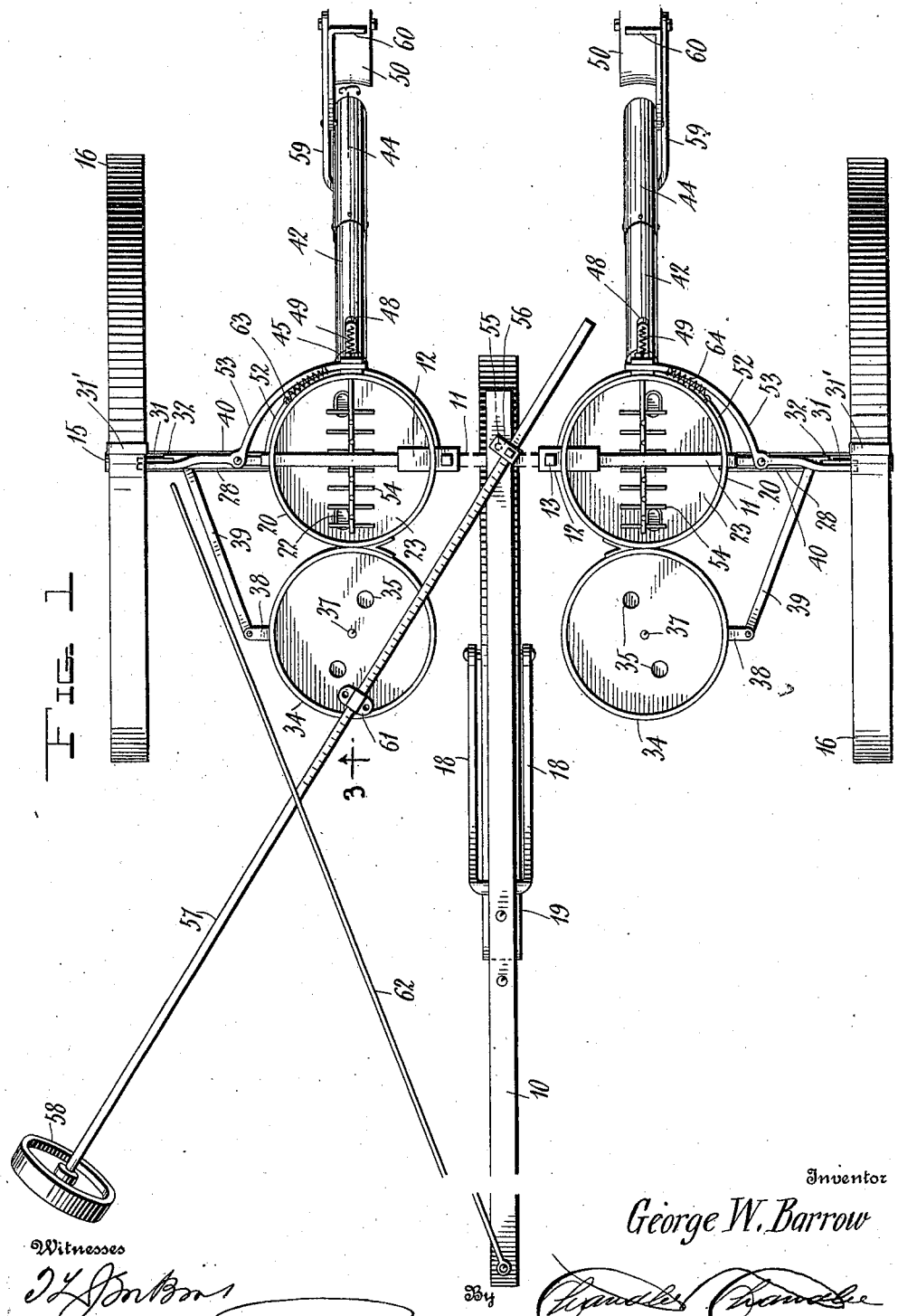

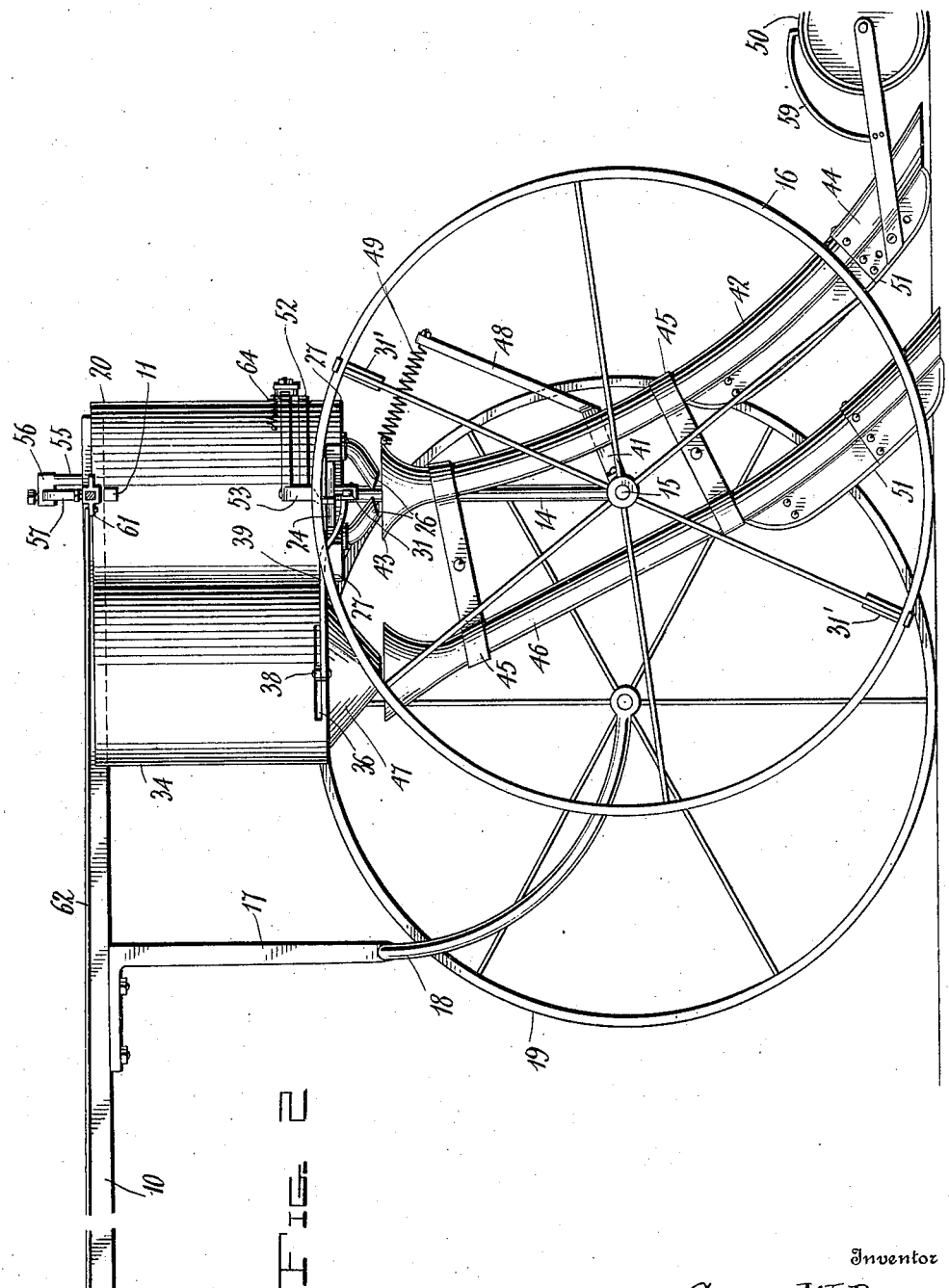

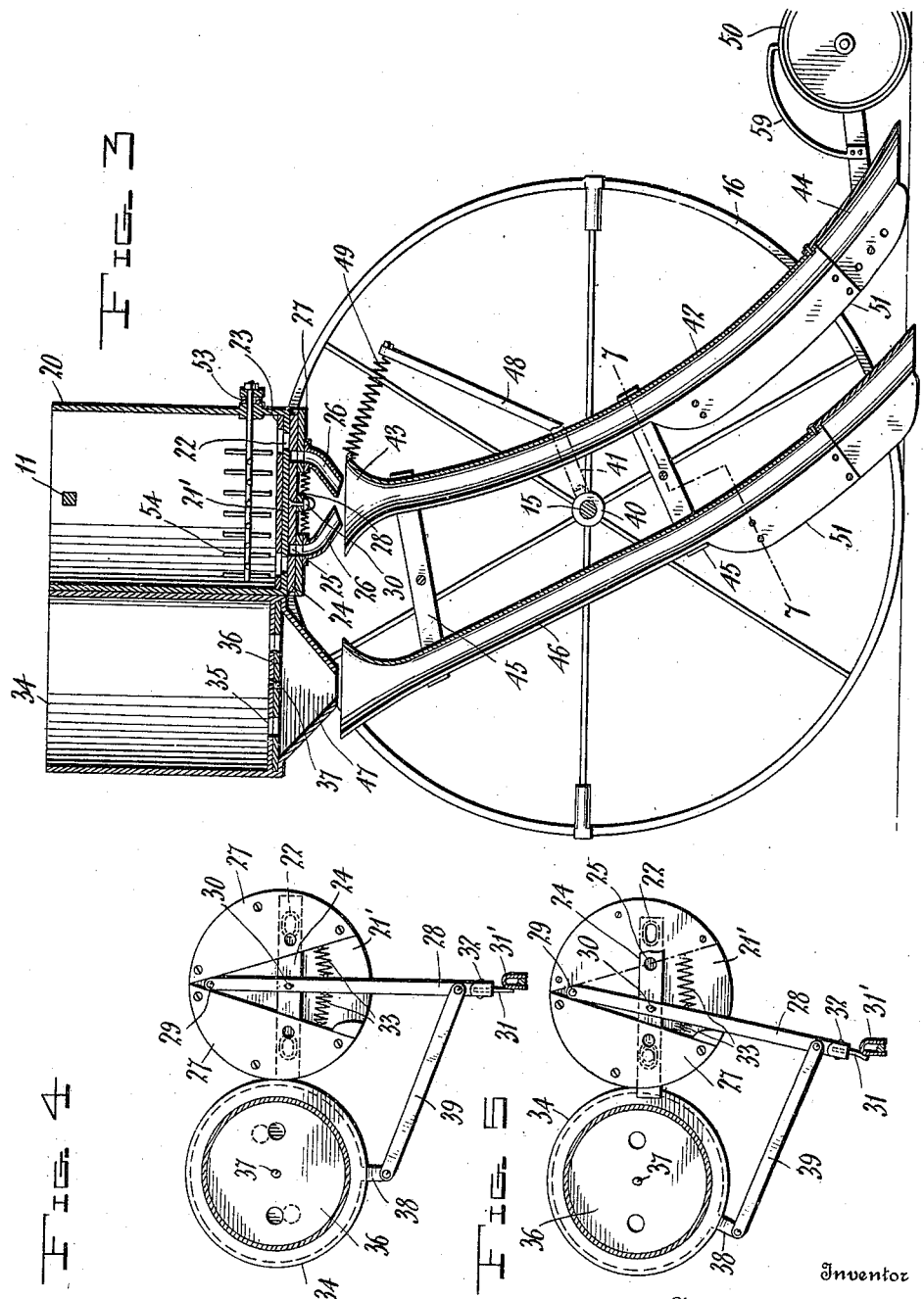

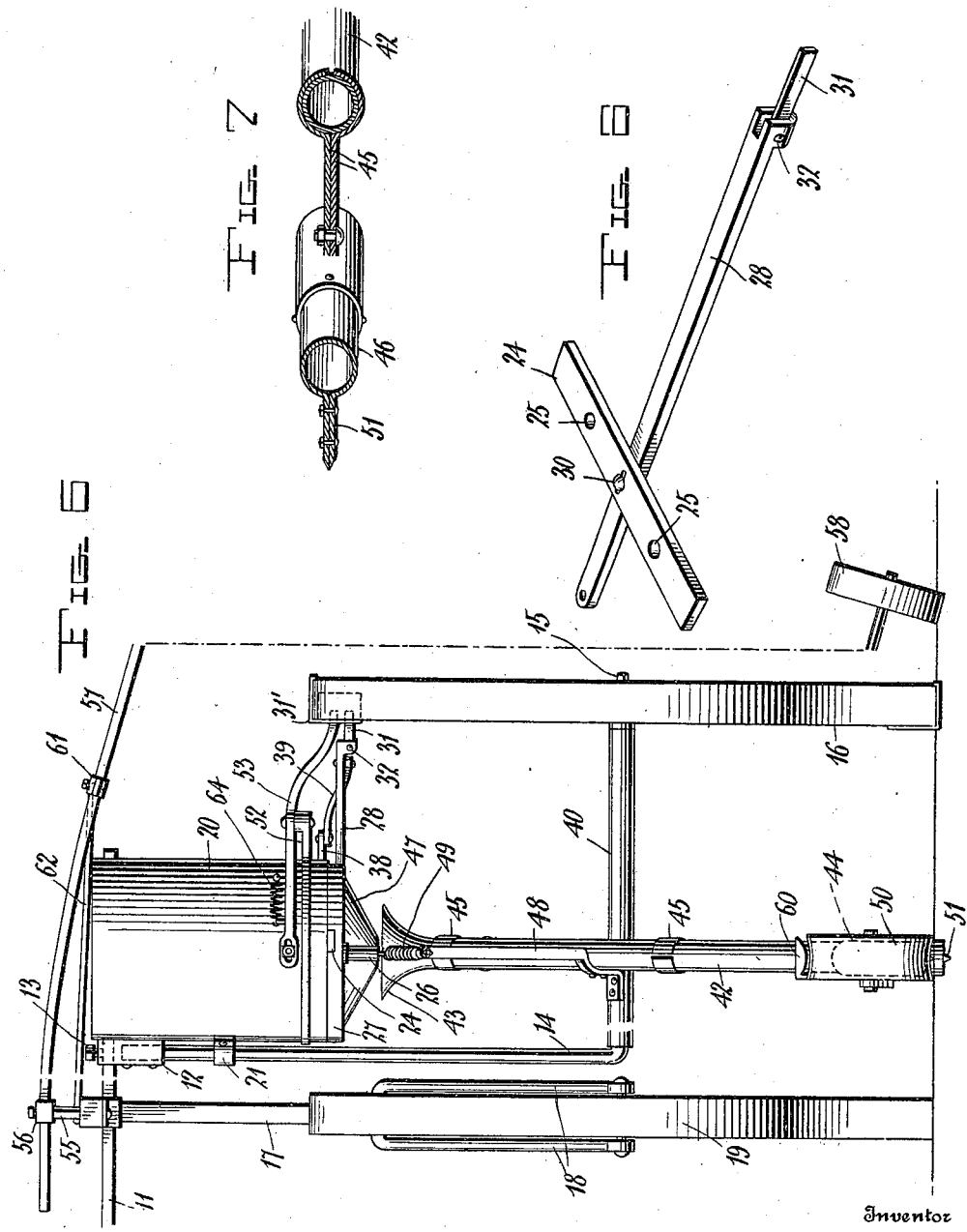

GEORGE W. BARROW, OF RATCLIFF, ARKANSAS.

SEED-PLANTER.

963,112.  Specification of Letters Patent.   Patented July 5, 1910.

Application filed July 26, 1909. Serial No. 509,633.

*To all whom it may concern:*

Be it known that I, GEORGE W. BARROW, a citizen of the United States, residing at Ratcliff, in the county of Logan, State of Arkansas, have invented certain new and useful Improvements in Seed-Planters; and I do hereby declare the following to be a full, clear, and exact description of the invention, such as will enable others skilled in the art to which it appertains to make and use the same.

The invention relates to planting machines and more particularly to the class of seed planters.

The primary object of the invention is the provision of a machine in which fertilizer may be deposited in an open furrow in advance of the deposit of seed within the open furrow by the dropping mechanism of the machine.

Another object of the invention is the provision of a machine of this character in which seed may be dropped at intervals in rows during the advancement of the machine through a field and the automatic delivery of fertilizer in an open furrow prior to the deposit of the seed.

The invention has for a still further object the construction of a machine of this type which is generally improved and that will operate in a ready and easy manner.

A still further object of the invention is the provision of a machine of this character which is simple in construction, thoroughly reliable and efficient in operation, and inexpensive in the manufacture.

In the drawings accompanying and forming part of this specification is illustrated the preferred form of embodiment of the invention, which to enable those skilled in the art to carry the invention into practice, will be set forth at length in the following description, while the novelty of the invention will be brought out in the claims succeeding the description.

In the drawings:—Figure 1 is a top plan view of the planter. Fig. 2 is a fragmentary side elevation of the same. Fig. 3 is a sectional view on the line 3—3 of Fig. 1. Fig. 4 is a bottom plan view of one pair of adjacent seed and fertilizer receptacles, the fertilizer receptacle being partly in section. Fig. 5 is a similar view with parts in shifted position. Fig. 6 is a fragmentary rear elevation of the planter. Fig. 7 is a sectional view on the line 7—7 of Fig. 3. Fig. 8 is an enlarged fragmentary perspective view of the outer portion of the operating arm controlling the slide in the seed receptacle, and the yieldable pivotal striker terminal.

Similar reference characters indicate corresponding parts throughout the several views in the drawings.

In the drawings, the numeral 10 designates the center or main draft beam of the planter machine to which near the rear end thereof is connected a cross bar 11, supporting adjustable sleeves 12, which latter are held securely on the bar by set screws 13, and these sleeves have secured thereto depending L-shaped axles 14, upon the spindle extremities 15, of which are journaled ground or supporting wheels 16, which latter are of the usual construction having radially extending spokes.

At a distance slightly in advance of the cross bar 11 and secured to the under face of the center or draft beam 10, is a depending bracket 17, terminating in forked extremities 18, the latter being rearwardly curved and supporting therebetween a caster wheel 19, which travels centrally of the machine slightly in advance of the supporting wheel thereof.

Mounted upon the vertical portions of the L-shaped axle 14, are grain receptacles or boxes 20, which latter are preferably cylindrical in shape and being secured to the vertical portions of the axles by means of clips 21. These grain receptacles or boxes 20 at their upper portions are suitably perforated at diametrically opposite points to permit the cross bar 11, to extend through the same when the said receptacles or boxes are mounted in position on the machine at opposite sides of its center or draft beam. Each grain receptacle or box 20, is provided with a main flat bottom 21′, having spaced openings 22, in alinement with each other and above this main bottom is mounted a supplemental bottom 23, the latter containing openings of greater diameter than the openings 22, and in register with the latter. This supplemental bottom 23, is secured to the main bottom in any suitable manner and may be removed at will so that another supplemental bottom may be substituted with openings of a corresponding diameter with respect to the openings 22, in the main bottom of the receptacle to increase the supply of grain delivered from the receptacle as the occasion may demand.

Movable in a suitable transverse guideway contained in the main bottom 21, is a cut off slide 24, the latter containing spaced alining openings 25, which alternately receive a supply of seed from the openings 22, in the main bottom to deliver the seed to discharge spouts 26, which depend from semi-circular-shaped plates 27, secured to the main bottom of the grain receptacle or box. These plates 27 are secured in such a manner to the bottom of the grain receptacle or box 20, so as to form a V-shaped opening therebetween and in this opening is adapted to swing a striker arm 28, which is pivoted as at 29, at its inner end to the main bottom and is also connected by a pivot 30, to the cut off slide 24.

Each striker arm 28, at its outer end has connected thereto a yieldable contact finger 31, which is pivoted as at 32, to the arm to permit it to be swung up out of the path of movement of the offsets 31' on the spokes of the supporting wheel 16, or to be swung into the path of movement of the same so that upon advancement of the planter the offsets of the ground or supporting wheels 16 will actuate the cutoff slides 24, to regulate the delivery of seed from the grain receptacles or boxes 20, onto the ground. Arranged at opposite sides of the arm 28, and connected to the same and to the plates 27, are coiled resetting springs 33, which latter serve to return the arms to a common central point between the semi-circular-shaped plates secured to the bottom of the receptacles.

Disposed in advance of the grain receptacles or boxes are fertilizer receptacles or boxes 34, containing in their bottoms spaced openings 35, controlled by a cutoff slide 36, centrally pivoted as at 37, for oscillatory movement, and this slide is formed with an extension 38, to which is pivoted a link 39, which latter is also pivoted to the striker arms 28 so that the cutoff slides 36, will be simultaneously operated with the cutoff slides 24 in the grain receptacles and in this manner regulate the delivery of fertilizer from the receptacles or boxes 34 to the ground.

Surrounding the spindles 15, are tubular boxings 40, the latter having fixedly connected thereto brackets or yoke pieces 41, loosely supporting feeding chutes or tubes 42, which latter are formed with flared upper ends 43, communicating with the spouts 26, leading from the grain receptacles or boxes. Connected to the lower ends of the chutes or tubes 42, are detachable foot sections 44, which may be removed when worn at the will of an operator.

Mounted in advance of the feeding chutes or tubes 42, and connected thereto by strap members 45, are fertilizer delivery chutes or tubes 46, which latter are positioned to communicate with the hopper bottoms 47 of the fertilizer receptacles or boxes 34, so that fertilizer may be delivered through the chutes or tubes 46, on the ground in advance of the feeding chutes or tubes 42 of the machine.

Rising from the brackets or yokes 41, are arms 48, to the outer free ends of which are connected retractile springs 49, the latter also connected to the flared upper terminals 43 of the feeding chutes or tubes 42, so as to normally hold the chutes or tubes in position to have their lower ends extend in close proximity to the ground. It is obvious that these springs 49 will also permit the said chutes or tubes to raise vertically should the same contact with an obstruction so as to overcome any possibility of injury resulting therefrom.

Secured to each of the feeding tubes or chutes 42, is a gage wheel 50, which latter is adapted to travel at the rear of an open furrow, to maintain the chutes or tubes at their discharge ends a predetermined elevation from the bottoms of open furrows formed in the ground and also subsequently close the same. Formed on the chutes 42 and 46 at their lower extremities, are share wings or blades 51, which project a distance forwardly of the said tubes or chutes and serve to cut the earth as the machine advances through a field to clear the open furrows therein prior to the dropping of fertilizer and seed into the same.

Secured to the receptacles are bowed supporting brackets 52, which latter extend about or around one-half of the said grain or seed receptacles or boxes and have connected thereto pivotal actuating arms 53, the outer free ends of which extend into the path of movement of the offsets 31' of the ground wheels to be operated thereby. The inner ends of these actuating arms 53, are connected to agitators 54, adapted to reciprocate within the seed receptacles or boxes to stir or agitate their contents during the travel of the machine.

Mounted near the rear end of the draft or center beam 10, is a rotatable pin 55, having a squared recess head 56, receiving the inner squared extremity of a marker beam 57, which latter has journaled at its outer end a marker wheel or disk 58, which latter contacts with the ground at one side of the machine during the travel thereof for marking off the field. The beam 57, may be swung from one side to the other of the machine so that the marker wheel 58, may be located on either side of said machine. The squared extremity of the marker beam 57, is provided with degree marks so that this beam may be accurately adjusted in the head of the rotatable pin 55, by an operator.

The gage wheels 50, are adjustably connected to the lower extremities of the feeding tubes or chutes 42, by means of brackets 59, the latter having rising therefrom scrapers 60, which act upon the gage wheel 50, to disperse mud and dirt therefrom as the machine travels through a field.

Mounted on the marker beam 57 is an eye member 61, which latter is adapted to be engaged by a hook rod 62 pivoted to the draft beam at its forward end to hold the marker arm locked when thrown to either side of the machine.

Formed exteriorly of the seed receptacles or boxes 20, are bolts 63, to which are connected retractile springs 64, the latter being also connected to the arms 53, of the agitators 54, so as to normally position the striker ends of the arms 53, in the path of movement of the offsets 31' on the supporting wheels 19, so that the seed will be agitated within the said receptacles when the machine is advanced through a field. It is obvious that should it be desired to discontinue the delivery of seed and fertilizer to the ground, the striker members 31, due to their pivotal connection with the extension 28, may be turned up so as to avoid the same being operated upon by the offsets 31' on the wheels 16, of the machine.

It is clearly obvious that the ground or supporting wheels 16, may be spaced apart or brought closer together at the will of an operator and in changing the position of these wheels will also cause a change of position of the delivery tubes or chutes so that open furrows may be varied in spaced relation to each other. It being understood of course that the furrows are formed in any well known manner by any suitable plow attachment (not shown).

In operation as the machine is advanced through a field the fertilizer is automatically delivered from the fertilizer receptacle through the tubes 46, into open furrows and this is accomplished by the spokes of the wheel 16, acting upon the striker members 31, carried by the extensions 28 having connections with the cutoff slides which control the discharge openings in the bottom of the fertilizer receptacles or boxes. The seed from the grain receptacles or boxes 20, is dropped in to the open furrows subsequent to the deposit of the fertilizer therein and this is accomplished by actuating the striker arms 28, which latter are engaged by the spokes of the supporting wheels 16, as the same rotate and these arms 28, will reciprocate the slides 24, in the guideways formed in the bottoms 21', of the grain receptacles or boxes 20, to control the feed of seed therefrom into the grain chutes or tubes 42 which deliver the seed to the open furrow.

What is claimed is:—

1. A seed planter comprising spaced ground wheels, an axle supporting the same, laterally adjustable pairs of receptacles mounted upon the axle, chutes in communication with the receptacles and having loose journal connections with the axle, gage wheels adjustably connected to the lower ends of the chutes, means acting upon the chutes to hold their lower ends in close relation to the ground and mechanism actuated by the wheels to assist in the discharge of fertilizer and seed from the receptacles to said chutes.

2. In a seed planter a center draft beam, wheeled axles having connection with said draft beam, seed receptacles supported at opposite sides of the draft beam and adjustable toward and away from the same, means actuated by the spokes of the wheels to regulate the delivery of seed from the receptacle, feeding chutes loosely supported by the axles and in communication with the receptacles, gage wheels adjustably connected to the lower ends of said chutes, spring means acting upon the chutes to hold the gage wheels in contact with the ground, and fertilizer distributer means arranged in advance of the feeding chutes.

3. In a seed planter a center draft beam, wheeled axles having connection with said draft beam, seed receptacles supported at opposite sides of the draft beam and adjustable toward and away from the same, means actuated by the spokes of the wheels to regulate the delivery of seed from the receptacles, feeding chutes loosely supported by the axles and in communication with the receptacles, gage wheels adjustably connected to the lower ends of said chutes, spring means acting upon the chutes to hold the gage wheels in contact with the ground, fertilizer distributer means arranged in advance of the feeding chutes, a caster wheel supported by the center beam in advance of the wheeled axles, and means actuated by the wheels on said axle for controlling the fertilizer distributer means.

4. The combination with a wheeled frame, of seed distributing means supported thereby, chutes journaled upon the frame for rocking movement, and means tensioning the chutes to normally hold their lower ends in close relation to the ground to permit vertical movement thereof, the said chutes being in communication with the seed distributing means.

5. In a seed planter, a wheeled axle, receptacles laterally adjustable upon the axle, mechanism actuated by the wheels and adapted to control the discharge of material from the receptacles, chutes in communication with the receptacles and adapted for raising and lowering movement relative to the ground, spring means normally holding the lower ends of the chutes in close relation to the ground, and gage wheels adjustably connected directly to the chutes.

6. In a seed planter, a wheeled axle, receptacles laterally adjustable upon the axle, mechanism actuated by the wheels and adapted to control the discharge of material from the receptacles, chutes in communication with the receptacles and adapted for raising and lowering movement relative to the ground, spring means normally holding the lower ends of the chutes in close relation to the ground, gage wheels adjustably connected directly to the chutes, furrow opening means formed on the chutes, and furrow closing means connected to the chutes and traveling in the rear thereof.

7. In a seed planter, a wheeled axle, receptacles laterally adjustable upon the axle, mechanism actuated by the wheels and adapted to control the discharge of material from the receptacles, chutes in communication with the receptacles and adapted for raising and lowering movement relative to the ground, spring means normally holding the lower ends of the chutes in close relation to the ground, gage wheels adjustably connected directly to the chutes, furrow opening means formed on the chutes, furrow closing means connected to the chutes and traveling in the rear thereof, and means supported by said mechanism and movable into and out of the path of the wheels to bring said mechanism into and out of operation.

In testimony whereof, I affix my signature, in presence of two witnesses.

GEORGE W. BARROW.

Witnesses:
W. O. ELEM,
J. H. HERRING.